US008901231B2

(12) United States Patent
Brand et al.

(10) Patent No.: US 8,901,231 B2
(45) Date of Patent: Dec. 2, 2014

(54) PROCESS FOR PREPARING POLY(METH)ACRYLATE-GRAFT-POLYLACTONE POLYMERS

(75) Inventors: Thorsten Brand, Marl (DE); Gabriele Brenner, Duelmen (DE); Cornelia Borgmann, Chatham, NJ (US); Rene Koschabek, Weinheim (DE); Sven Balk, Frankfurt (DE)

(73) Assignee: Evonik Degussa GmbH, Essen (DE)

( * ) Notice: Subject to any disclaimer, the term of this patent is extended or adjusted under 35 U.S.C. 154(b) by 183 days.

(21) Appl. No.: 13/513,997

(22) PCT Filed: Nov. 25, 2010

(86) PCT No.: PCT/EP2010/068202
§ 371 (c)(1),
(2), (4) Date: Jun. 5, 2012

(87) PCT Pub. No.: WO2011/073006
PCT Pub. Date: Jun. 23, 2011

(65) Prior Publication Data
US 2012/0252956 A1 Oct. 4, 2012

(30) Foreign Application Priority Data

Dec. 18, 2009 (DE) .......................... 10 2009 055 009

(51) Int. Cl.
*C08G 63/78* (2006.01)
*C08G 63/08* (2006.01)

(52) U.S. Cl.
CPC ............... *C08G 63/08* (2013.01); *C08G 63/78* (2013.01); *C08G 2261/128* (2013.01); *C08J 2321/00* (2013.01)
USPC .......................... 524/502; 525/330.3; 528/310

(58) Field of Classification Search
CPC ............................... C08G 63/78; C08G 63/08
USPC ........................ 524/502; 525/330.3; 528/310
See application file for complete search history.

(56) References Cited

U.S. PATENT DOCUMENTS

| 5,225,497 | A | 7/1993 | Ishii et al. |
|---|---|---|---|
| 8,053,522 | B2 | 11/2011 | Loehden et al. |
| 8,106,129 | B2 | 1/2012 | Balk et al. |
| 2003/0149227 | A1* | 8/2003 | Okazaki ........................ 528/310 |
| 2004/0191418 | A1 | 9/2004 | Suwama et al. |
| 2007/0142507 | A1 | 6/2007 | Huybrechts et al. |
| 2011/0082252 | A1 | 4/2011 | Koschabek et al. |
| 2011/0196087 | A1 | 8/2011 | Brenner et al. |

FOREIGN PATENT DOCUMENTS

| EP | 0 281 095 | 9/1988 |
|---|---|---|
| EP | 1 464 674 | 10/2004 |
| JP | 48-44390 A | 6/1973 |
| JP | 2-302429 A | 12/1990 |
| JP | 10-259240 A | 9/1998 |
| JP | 2000-16967 A | 1/2000 |

OTHER PUBLICATIONS

Office Action issued Apr. 7, 2014 in Japanese Patent Application No. 2012-543577 (submitting English language translation only).
International Search Report issued on Jan. 7, 2011 in PCT/EP10/068202 filed on Nov. 25, 2010.

* cited by examiner

*Primary Examiner* — James J Seidleck
*Assistant Examiner* — Deve E Valdez
(74) *Attorney, Agent, or Firm* — Oblon, Spivak, McClelland, Maier & Neustadt, L.L.P.

(57) ABSTRACT

The present invention relates to a process for preparing poly(meth)acrylate-graft-polylactone polyols.

21 Claims, No Drawings

PROCESS FOR PREPARING POLY(METH)ACRYLATE-GRAFT-POLYLACTONE POLYMERS

The present invention relates to a process for preparing poly(meth)acrylate-graft-polylactone polyols. The polymer architectures of the invention possess a poly(meth)acrylate backbone with polylactone side chains. The side chains are synthesized by ring-opening polymerization of lactones with grafting onto nucleophilic groups that are present in the poly(meth)acrylate backbone. With the process of the invention the grafting reaction proceeds to such a high degree that the poly(meth)acrylate starting material used is fully reacted with lactone. A feature of the process is that there is no need for a separate purification step for removing unreacted lactone.

The synthesis of polymer architectures which are based on a combination of polyesters and poly(meth)acrylates has been a subject of industrial research since as long ago as the middle of the 1960s. The potential applications of such materials include, for example, dispersants (see EP 1 555 174 for example), impregnating compositions (GB 1,007,723), binders for coatings (described in DE 2 006 630, JP 09 216 921 or DE 4 345 086, for example) or for adhesives (in DE 2 006 630, for example).

The possibilities of the targeted combination of poly(meth)acrylates and polyesters are diverse. For instance, systems comprising polyester main chains and (meth)acrylate side chains are known from DE 44 27 227.

The ring-opening polymerization of lactones to polyesters is prior art and is described for example in *Macromolecules* 2002, 35, 1504-1512 and *Macromol. Chem. Phys.* 2001, 202, 2963-2970.

For the production of polymer architectures which possess a poly(meth)acrylate main chain and polyester side chains there are various pathways that can be taken.

EP 1227113 describes the ring-opening polymerization of ε-caprolactone by hydroxyl-functional monomeric acrylate compounds, e.g. hydroxyethyl acrylate. The products of this reaction can then be subjected to copolymerization free-radically, for example, with other unsaturated compounds. This method, however, can be carried out only with a small amount of ε-caprolactone.

Similarly, EP 1 464 674 discloses the preparation of comb-like polymers with a poly(meth)acrylate main chain and polyester side chains by the free-radical polymerization of ε-caprolactone-modified vinyl monomers. These are ε-caprolactone oligomers which can be obtained by ring-opening oligomerization using hydroxy(meth)acrylates such as, for example, hydroxybutyl(meth)acrylate. The ε-caprolactone-modified vinyl monomers are marketed commercially, for example, by Daicel Chemical Industries under the brand name Placcel F. This method is complicated and therefore costly. The purification of the macromonomers is very complicated. In addition it is found that such macromonomers are available only to a very limited extent with a maximum number of 10 repeating caprolactone units.

A further method (in JP 06206974, for example) involves first reacting ε-caprolactone to form the homopolymer and then coupling it to a polyacrylate polyol by means of a diisocyanate or polyisocyanate. In this way it is possible to obtain defined products with a low homopolymer fraction. A disadvantage of this process is the high technical expenditure occasioned by the separate preparation of the individual polymer blocks and their subsequent coupling by means of an isocyanate component. Moreover, the handling of isocyanates is problematic from a toxicological standpoint.

EP 281 095 describes the simultaneous main chain and side chain polymerization. It uses acrylate monomers which possess nucleophilic functionalities and which, propagated during the synthesis of the main chain, initiate side-chain construction through ring opening of lactones.

This process, however, is an uncontrolled process, and leads to product mixtures with a multiplicity of very different components, such as pure acrylate polymers, for example. An inevitable consequence of this for the person skilled in the art is that, under the conditions of an ionic lactone polymerization, the free-radical polymerization that is carried out in situ inevitably leads to secondary reactions such as partial gelling of the products. Instances of crosslinking of this kind, however, are of great disadvantage for the processing of the product, even if they occur only to a small extent. Furthermore, the process described operates in organic solvents, and this, depending on the further use of the resulting polymer, may imply an additional expense and effort for their removal.

The objective of the present invention, in contrast, is the targeted synthesis of ungelled graft copolymers which as well as a defined (meth)acrylate main chain possess polylactone side chains.

Surprisingly it has been found that ring-opening polymerization of lactones onto poly(meth)acrylates which carry nucleophilic groups can be used to produce polyhydroxyl architectures with polylactone side chains and a poly(meth)acrylate main chain.

Accordingly, the present invention first provides a process for preparing poly(meth)acrylate-graft-polylactone polymers, comprising the ring-opening polymerization of lactones onto poly(meth)acrylates with nucleophilic groups at temperatures ≥160° C. and pressures ≤10 mbar, with addition of a catalyst.

The process of the invention has the advantage that it is simple to carry out and that it is not accompanied by any gelling or unwanted crosslinking. A feature of the process is that there is no need for a separate purification step for the removal of unreacted lactone.

The formulation "poly(meth)acrylate" describes not only polyacrylates but also polymethacrylates or copolymers of acrylates and methacrylates.

The poly(meth)acrylate main chain is based on monomers or monomer mixtures, the monomers and/or monomer mixtures comprising, in particular, monomers having nucleophilic groups. Such monomers may be selected from the group of the methacrylates and/or acrylates. The nucleophilic groups are preferably selected from the group encompassing hydroxyl groups, amino groups and/or mercapto groups. With particular preference the nucleophilic groups are hydroxyl groups.

With particular preference the nucleophilic groups are incorporated by copolymerization of OH-group-containing monomers into the poly(meth)acrylate used in accordance with the invention. Particularly preferred are OH-functionalized acrylates and/or methacrylates. As preferred examples it is possible to list hydroxyethyl methacrylate, hydroxyethyl acrylate, hydroxypropyl methacrylate, hydroxypropyl acrylate, 2,3-dihydroxypropyl acrylate and 2,3-dihydroxypropyl methacrylate.

The amount of monomers having nucleophilic groups in the poly(meth)acrylate backbone of the invention is in the range of 0.1% and 10% by weight, preferably between 0.1% and 5.0% by weight, more preferably between 1.0% to 2.5% by weight, based on the total amount of monomers for the synthesis of the poly(meth)acrylate backbone.

The poly(meth)acrylate prepolymers used preferably have an OH number of between 5 mg KOH/g and 40 mg KOH/g, more preferably between 10 mg KOH/g and 35 mg KOH/g and with particular preference between 15 mg KOH/g and 30 mg KOH/g. The hydroxyl number (OH number) is determined in accordance with DIN 53240-2.

Further to the building blocks which carry nucleophilic groups, the poly(meth)acrylates used in accordance with the invention are composed of monomers selected from the group consisting of (meth)acrylates such as, for example, alkyl (meth)acrylates of straight-chain, branched or cycloaliphatic alcohols having 1 to 40 C atoms, such as methyl (meth) acrylate, ethyl (meth)acrylate, n-butyl (meth)acrylate, i-butyl (meth)acrylate, t-butyl (meth)acrylate, pentyl(meth)acrylate, 2-ethylhexyl(meth)acrylate, stearyl(meth)acrylate, lauryl (meth)acrylate, cyclohexyl(meth)acrylate and isobornyl (meth)acrylate, for example; aryl(meth)acrylates such as, for example, benzyl (meth)acrylate or phenyl(meth)acrylate, each of which may have aryl radicals which are unsubstituted or substituted 1-4 times; other aromatically substituted (meth)acrylates such as, for example, naphthyl(meth)acrylate; mono(meth)acrylates of ethers, polyethylene glycols, polypropylene glycols or mixtures thereof having 5-80 C atoms, such as tetrahydrofurfuryl methacrylate, for example, methoxy(m)ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether(meth)acrylate and poly (propylene glycol) methyl ether(meth)acrylate, together.

As well as the (meth)acrylates set out above, the compositions to be polymerized may also contain further unsaturated monomers which are copolymerizable with the aforementioned (meth)acrylates and by means of free-radical polymerization. Such monomers include, among others, 1-alkenes, such as 1-hexene, 1-heptene, branched alkenes such as, for example, vinylcyclohexane, 3,3-dimethyl-1-propene, 3-methyl-1-diisobutylene, 4-methyl-1-pentene, acrylonitrile, vinyl esters such as vinyl acetate, styrene, substituted styrenes having an alkyl substituent on the vinyl group, such as α-methylstyrene and α-ethylstyrene, for example, substituted styrenes having one or more alkyl substituents on the ring, such as vinyltoluene and p-methyistyrene, halogenated styrenes such as, for example, monochlorostyrenes, dichlorostyrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinylimidazole, vinyloxolane, vinylfuran, vinylthiophene, vinylthiolane, vinylthiazoles, vinyloxazoles and isoprenyl ethers; acids and acid derivatives, such as (meth)acrylic acid, maleic anhydride, maleimide, methylmaleimide, for example, and dienes such as divinylbenzene, for example. Furthermore, the above-stated monomers may also have a hydroxyl and/or amino and/or mercapto functionality in a substituent. Such monomers are, for example, vinylpiperidine, 1-vinylimidazole, N-vinylpyrrolidone, 2-vinylpyrrolidone, N-vinylpyrrolidine, 3-vinylpyrrolidine, N-vinylcaprolactam, N-vinylbutyrolactam, hydrogenated vinylthiazoles and hydrogenated vinyloxazoles. Particular preference is given to using vinyl esters, vinyl ethers, fumarates, maleates, styrenes or acrylonitriles.

The poly(meth)acrylate prepolymers of the invention preferably have a molecular weight $M_w$ of between 1 000 and 200 000 g/mol. Particular preference is given to a molecular weight $M_w$ of between 5 000 and 100 000 g/mol, and very particular preference to a molecular weight $M_w$ of between 10 000 and 50 000 g/mol.

The weight average of the molecular weight, $M_w$, is determined by means of gel permeation chromatography with RI detection in accordance with DIN 55672-1, with tetrahydrofuran as eluent against a polystyrene standard.

Specifically the poly(meth)acrylate prepolymer is advantageously selected, in terms of proportion and composition, with regard to the desired technical function.

The poly(meth)acrylate prepolymers used in accordance with the invention may be prepared by means of bulk, emulsion, suspension, minisuspension or microsuspension or solution polymerization. The polymerization process used may be a free-radical or controlled-growth radical polymerization. Examples of controlled-growth radical polymerization processes are nitroxide mediated polymerization (NMP) and reversible addition-fragmentation chain transfer (RAFT) polymerization.

The free-radical initiators to be used are dependent on the selected polymerization method or polymerization technology. The particular initiators to be used are known to a person skilled in the art and/or are described in the polymer literature that is general knowledge to a person skilled in the art. As an example, in free-radical solution or suspension polymerization, it is common to use azo compounds such as AIBN or peresters such as tert-butyl peroctoate or lauryl peroxide as the free-radical initiator.

Where appropriate, in order to adjust the desired molecular weight of the poly(meth)acrylate prepolymer, it is additionally possible to use regulators as well. Examples of suitable regulators include sulphur regulators, especially regulators containing mercapto groups, e.g. dodecyl mercaptan. The concentrations of regulators are generally 0.1% by weight to 2.0% by weight, based on the total polymer.

The poly(meth)acrylate-graft-polylactone polymers of the invention can be prepared by means of established techniques for polymerization reactions. Preparation may take place in solution or in the melt, through the ring-opening polymerization of the lactones onto the nucleophilic groups of the poly (meth)acrylates used. Preparation takes place preferably in the melt at temperatures ≥160° C. and pressures ≤10 mbar, preferably at 170-210° C. and pressures ≤5 mbar, and very preferably at 170-190° C. and pressures ≤3 mbar, with addition of a catalyst.

As lactone for the grafting reaction it is possible in principle to use any lactone, examples being γ-butyrolactone, γ-valerolactone, δ-valerolactone, tetramethylene carbonate, 3-oxa-ε-caprolactone, and 1,4-dioxan-2-one. Preference is given to employing β-propiolactone and β-butyrolactone, and particular preference to using ε-caprolactone.

Examples of suitable catalysts are compounds which are also used in polycondensation reactions for the synthesis of polyesters, or mixtures thereof. Examples of such catalysts are preferably metal compounds or mixtures thereof, based more particularly on magnesium, aluminium, titanium, antimony, bismuth and tin, examples being butyl titanate and antimony(III) acetate. Suitable with very particular preference are tin-containing catalysts, such as monobutyltin oxide, butyltin tris-2-ethylhexanoate and tin octoate, for example.

In one embodiment of the process, solvents are added to the reaction medium, examples being aromatic hydrocarbons or mixtures thereof and/or ketones such as, for example, cyclohexanone, isobutyl ketone, methyl hexyl ketone and methyl heptyl ketone. In the particularly preferred embodiment of the process no solvent is employed. This is advantageous because, during the vacuum phase of the reaction, there is no solvent product formed, the reaction space can be utilized very largely for the product to be produced, and no separate work-up step is needed. The process of the invention can be carried out in batch mode or continuously, in an extruder, for example.

The poly(meth)acrylate-graft-polylactone polymers may, optionally, be provided without or with processing assistants or additives such as antioxidants, for example.

The poly(meth)acrylate-graft-polylactone polymer of the invention preferably has a weight-average molecular weight $M_w$ of 2000 and 250 000 g/mol, preferably 7000 and 150 000 g/mol, and very preferably between 12 000 and 75 000 g/mol.

The weight-average molecular weight $M_w$ is determined by means of gel permeation chromatography with RI detection in accordance with DIN 55672-1, with tetrahydrofuran as eluent, against polystyrene standard.

The present invention further provides poly(meth)acrylate-graft-polylactone polymers obtainable by a process of the invention.

The poly(meth)acrylate-graft-polylactone polymers obtained by the process of the invention have a polydispersity index (PDI) of ≤8 and have an acid number of ≤5 mg KOH/g (determined in accordance with DIN EN ISO 2114), and preferably feature a monomodal molar mass distribution.

The polydispersity index is the name for the ratio of the average molecular weights $M_w/M_n$. In the present invention, the polymers obtained in accordance with the invention have a PDI of ≤8, preferably ≤6 and with particular preference of ≤4.

The poly(meth)acrylate-graft-polylactone polymers obtained with the process of the invention have the advantage that they are virtually free from unreacted lactone. Preferably the products of the invention contain no unreacted lactone.

For the poly(meth)acrylate-graft-polylactone polymers of the invention there is a broad field of application. The selection of the use examples is not apt to restrict the use of the polymers of the invention. The examples are merely intended to serve to give a random sample of the broad possibilities for use of the polymers described.

The polymers synthesized in accordance with the invention may be used, for example, in hotmelt adhesives, other adhesives, sealants, heat-sealing compositions, for polymer-analogous reactions or for the synthesis of subsequent copolymers. The polymers may also find use in formulations for cosmetic application, in coating materials, in paints, in dispersants, as a polymer additive or in packaging. The use of the poly(meth)acrylate-graft-polylactone polymers in the stated applications is likewise provided with the present invention.

Even without further remarks it is assumed that a person skilled in the art will be able to utilize the above description to its widest extent. The preferred embodiments and examples, therefore, are to be interpreted merely as a descriptive disclosure which is by no means in any way limiting.

Below, the present invention is elucidated in more detail with reference to examples. Alternative embodiments of the present invention are obtainable in an analogous manner.

EXAMPLES

General Information on Product Characterization

The values given in the tables below for the polydispersity index PDI are determined by means of gel permeation chromatography. Here, $PDI=M_w/M_n$=mass-average molecular weight/number-average molecular weight. The characterization of all the samples by gel permeation chromatography takes place in tetrahydrofuran as eluent in accordance with DIN 55672-1.

$M_n$ (RI)=number-average molecular weight (GPC, RI detection), reported in g/mol $M_w$ (RI)=mass-average molecular weight (GPC, RI detection), reported in g/mol $M_p$ (RI)=molecular weight at the peak maximum (GPC, RI detection), reported in g/mol The phase transition temperatures (e.g. glass transition temperatures $T_g$) are measured by means of DSC in accordance with DIN EN ISO 11357-1 and are reported in ° C. The values reported were taken from the second heating cycle.

The hydroxyl number (OH number), reported in mg KOH/g, is determined in accordance with DIN 53240-2.

The acid number, reported in mg KOH/g, is determined in accordance with DIN EN ISO 2114.

Example 1

Preparation of a Poly(meth)acrylate Prepolymer

A jacketed vessel with attached thermostat, reflux condenser, paddle stirrer and internal thermometer is charged with 245 g of butyl acetate, 120 g of methyl methacrylate and 2.5 g of 2-hydroxyethyl methacrylate. The mixture is heated to 105° C. and then admixed with 3.1 g of n-dodecyl mercaptan (in solution in 10 ml of butyl acetate). Initiation takes place by addition of 3.7 g of tert-butyl perbenzoate. After 20 minutes of stirring, a mixture of 50 g of butyl acetate, 8.2 g of tert-butyl perbenzoate, 9.7 g of n-dodecyl mercaptan, 361 g of methyl methacrylate and 7.5 g of 2-hydroxyethyl methacrylate is metered in over a period of four hours. After the end of the metered feed, stirring is continued at 105° C. for a further 2 hours and then at 90° C. for 2 hours. Lastly, the solvent is removed by distillation. The product obtained has the properties listed in Table 1.

Example 2

Preparation of a Poly(meth)acrylate Prepolymer

A jacketed vessel with attached thermostat, reflux condenser, paddle stirrer and internal thermometer is charged with 245 g of butyl acetate, 114 g of methyl methacrylate and 8.6 g of 2-hydroxyethyl methacrylate. The mixture is heated to 105° C. and then admixed with 2.4 g of n-dodecyl mercaptan (in solution in 10 ml of butyl acetate). Initiation takes place by addition of 3.0 g of tert-butyl perbenzoate. After 20 minutes of stirring, a mixture of 50 g of butyl acetate, 6.6 g of tert-butyl perbenzoate, 7.3 g of n-dodecyl mercaptan, 343 g of methyl methacrylate and 25.8 g of 2-hydroxyethyl methacrylate is metered in over a period of four hours. After the end of the metered feed, stirring is continued at 105° C. for a further 2 hours and then at 90° C. for 2 hours. Lastly, the solvent is removed by distillation. The product obtained has the properties listed in Table 1.

TABLE 1

| Example No. | OH number | Acid number | $M_n$ | $M_w$ | $M_p$ | PDI | $T_g$ |
|---|---|---|---|---|---|---|---|
| 1 | 20 | 1.9 | 4800 | 12 200 | 11 800 | 2.54 | 91 |
| 2 | 28 | 1.8 | 7800 | 18 700 | 17 400 | 2.40 | 100 |

Example 3

Preparation of a
Poly(meth)acrylate-graft-polylactone Polymer of the
Invention

A 1000 ml three-neck flask with distillation bridge is charged under an inert gas atmosphere with 250 g of ε-caprolactone, and this initial charge is heated to 50° C. Then 250 g of the prepolymer from Example 1 are added, while heating takes place further to 170° C. After the end of the addition, 0.05 g of butyltin tris-2-ethylhexanoate is added and the mixture is stirred at the same temperature for a further 2 hours. Then reduced pressure is applied (<3 mbar). After 3 hours, a colourless product is obtained. The characteristics are given in Table 2.

Example 4

Preparation of a
Poly(meth)acrylate-graft-polylactone Polymer of the
Invention

A 1000 ml three-neck flask with distillation bridge is charged under an inert gas atmosphere with 250 g of ε-caprolactone, and this initial charge is heated to 50° C. Then 250 g of the prepolymer from Example 2 are added, while heating takes place further to 180° C. After the end of the addition, 0.05 g of butyltin tris-2-ethylhexanoate is added at this temperature, and the mixture is stirred for a further 3 hours. Then reduced pressure is applied (<3 mbar). After 3 hours, a colourless product is obtained. The characteristics are given in Table 2.

Comparative Example C1

Reaction of a Poly(meth)acrylate with
ε-caprolactone

A 1000 ml three-neck flask with distillation bridge is charged under an inert gas atmosphere with 300 g of ε-caprolactone, and this initial charge is heated to 50° C. Then 300 g of the prepolymer from Example 1 are added, while heating takes place further to 150° C. After the end of the addition, stirring is continued for 2 hours. Subsequently, at this temperature, 0.06 g of butyltin tris-2-ethylhexanoate is added and reduced pressure (<3 mbar) is applied. After 3 hours, a colourless product is obtained. The characteristics are given in Table 2.

Comparative Example C2

Reaction of a Poly(meth)acrylate with
ε-caprolactone

A 1000 ml three-neck flask with distillation bridge is charged under an inert gas atmosphere with 150 g of ε-caprolactone, and this initial charge is heated to 50° C. Then 450 g of the prepolymer from Example 2 are added, while heating takes place further to 150° C. After the end of the addition, 0.06 g of butyltin tris-2-ethylhexanoate is added at this temperature, and the mixture is stirred for a further 2 hours. Subsequently the pressure is reduced to 15 mbar. After 3 hours, a turbid product is obtained. The characteristics are given in Table 2.

TABLE 2

| Example No. | OH number | Acid number | $M_n$ | $M_w$ | $M_p$ | PDI | $T_g$ | Residual ε-caprolactone[1] |
|---|---|---|---|---|---|---|---|---|
| 3 | 13 | 2.8 | 6400 | 18 300 | 17 100 | 2.86 | −38° C. | n.d. |
| 4 | 12 | 1.1 | 9600 | 56 400 | 45 300 | 5.88 | −39° C. | n.d. |
| C1 | 23 | 8.6 | 5100 | 12 300 | 13 600/2800 | 2.41 | −40° C. | 1.00 |
| C2 | 31 | 8.7 | 2200 | 20 300 | 21 300/1600 | 9.23 | n.d. | 3.40 |

[1]Determined graphically from the diagram of the gel permeation chromatography, in area percent
n.d. = not detectable

The invention claimed is:

1. A process for preparing a poly(meth)acrylate-graft-polylactone polymer, the process comprising
ring-opening polymerizing a lactone onto a poly(meth)acrylate comprising a nucleophilic group at temperatures ≥160° C. and pressures ≤10 mbar, in the presence of a catalyst.

2. The process according to claim 1, wherein the poly(meth)acrylate comprises, in polymerized form, a monomer comprising a nucleophilic group.

3. The process according to claim 1, wherein the nucleophilic group is at least one selected from the group consisting of a hydroxyl group, an acid group, an amino group and a mercapto group.

4. The process according to claim 2, wherein an amount of the monomer is in the range from 0.1% to 10% by weight, based on a poly(meth)acrylate fraction in the polyesteracrylate graft copolymer.

5. The process according to claim 1, wherein the nucleophilic group is a hydroxyl group.

6. The process according to claim 1, wherein the lactone is ε-caprolactone.

7. The process according to claim 1, wherein the catalyst comprises a metal compound.

8. The process according to claim 1, wherein the ring-opening polymerizing occurs in solution or in a melt.

9. The process according to claim 2, wherein the nucleophilic group is at least one selected from the group consisting of a hydroxyl group, an acid group, an amino group and a mercapto group.

10. The process according to claim 3, wherein an amount of the monomer is in the range from 0.1% to 10% by weight, based on a poly(meth)acrylate fraction in the polyesteracrylate graft copolymer.

11. The process according to claim 2, wherein the nucleophilic group is a hydroxyl group.

12. The process according to claim 2, wherein the lactone is ε-caprolactone.

13. The process according to claim 2, wherein the catalyst comprises a metal compound.

14. The process according to claim 2, wherein the ring-opening polymerizing occurs in solution or in a melt.

15. The process according to claim 1, wherein the poly(meth)acrylate has a weight average molecular weight of between 1,000 and 200,000 g/mol.

16. The process according to claim 1, wherein the poly(meth)acrylate has a weight average molecular weight of between 5,000 and 100,000 g/mol.

17. The process according to claim 1, wherein the poly(meth)acrylate has a weight average molecular weight of between 10,000 and 50,000 g/mol.

18. The process according to claim 1, wherein the poly(meth)acrylate has a weight average molecular weight of from 12,200 to 18,700.

19. The process according to claim 1, wherein the polymerizing forms a poly(meth)acrylate-graft-polylactone polymer having a weight average molecular weight of 18,300 to 56,400.

20. The process according to claim 1, wherein the polymerizing forms a poly(meth)acrylate-graft-polylactone polymer having a PDI of ≤8.

21. The process according to claim 1, wherein the polymerizing forms a poly(meth)acrylate-graft-polylactone polymer having an acid number of ≤5 mg KOH/g.

* * * * *